No. 774,667. PATENTED NOV. 8, 1904.
W. S. HOUSER.
PIPE COUPLING.
APPLICATION FILED FEB. 19, 1904.
NO MODEL.
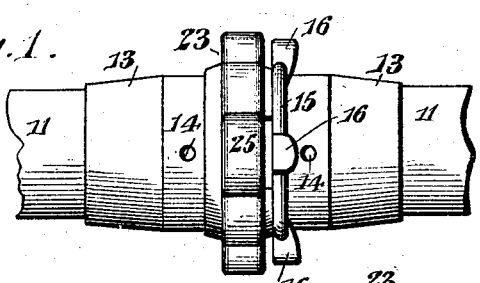
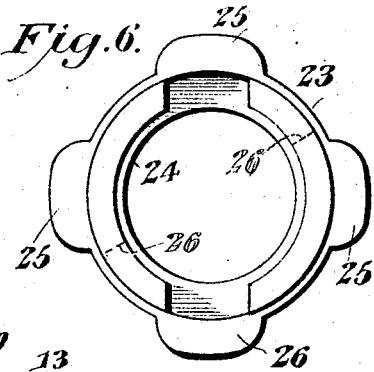
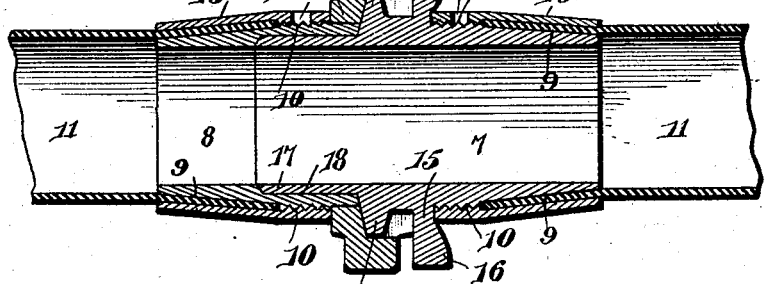
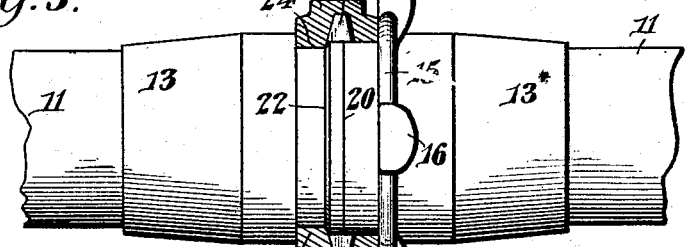
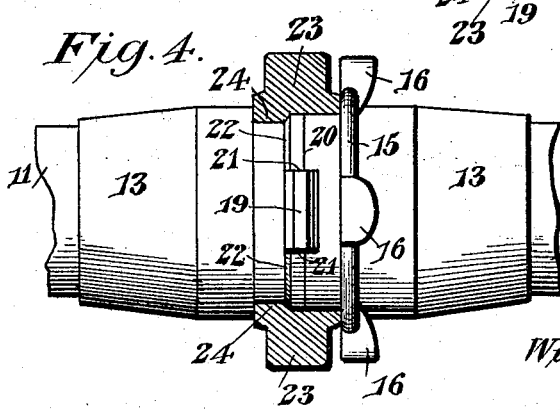
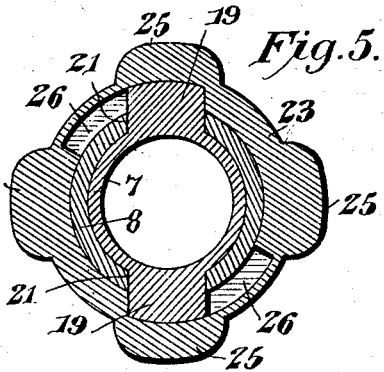
Winfield S. Houser, Inventor
Witnesses No. 774,667.

Patented November 8, 1904.

UNITED STATES PATENT OFFICE.

WINFIELD S. HOUSER, OF DUBOIS, PENNSYLVANIA, ASSIGNOR OF ONE-HALF TO GEORGE W. TOZIER, OF DUBOIS, PENNSYLVANIA.

PIPE-COUPLING.

SPECIFICATION forming part of Letters Patent No. 774,667, dated November 8, 1904.

Application filed February 19, 1904. Serial No. 194,402. (No model.)

*To all whom it may concern:*

Be it known that I, WINFIELD S. HOUSER, a citizen of the United States, residing at Dubois, in the county of Clearfield and State of Pennsylvania, have invented a new and useful Hose or Pipe Coupling; of which the following is a specification.

This invention relates to improvements in devices of that class employed for coupling hose or pipe sections.

The object is to provide a novel quick-action coupling wherein the parts may be quickly secured together or separated and when so secured are not liable to relative movement or accidental displacement, the said elements thereof being simple in construction and capable of being cheaply manufactured.

The preferred form of construction is illustrated in the accompanying drawings, wherein—

Figure 1 is a side elevation of a coupling constructed in accordance with the present invention. Fig. 2 is a longitudinal sectional view through the same on an enlarged scale. Fig. 3 is a side elevation with the coupling-ring in section. Fig. 4 is a view similar to Fig. 3, but at right angles thereto. Fig. 5 is a transverse sectional view through the coupling. Fig. 6 is a view in elevation of a coupling-ring.

Similar reference-numerals indicate corresponding parts in all the figures of the drawings.

In the embodiment illustrated a pair of coupling members 7 and 8 are employed, which are tubular in form. These members are shells, the outer faces of which are tapered toward their outer ends, as shown at 9. The portions of said shells inside the tapered ends are exteriorly threaded, as shown at 10. The tapered portions are adapted to be inserted in the ends of the hose sections or tubes 11, which are thus expanded, as illustrated in Fig. 2, and are held in place upon the shells by retaining-sleeves 13, the outer portions of which are tapered to correspond to the taper of the shells and bind upon the tube-sections, while the inner portions are internally threaded, the threads thereof engaging those of the shells. These sleeves may be provided with suitable openings 14 to receive operating devices. By these means the tubes are securely clamped to the coupling elements or members, and the retaining-sleeves at the same time are screwed directly to the shells.

The coupling member 7 is provided at the inner end of the threaded portion with an annular enlargement 15, provided with knobs 16, forming a holding-handle for the section. Said section is furthermore provided at the end opposite the clamp-sleeve with the reduced projecting collar 17, that is adapted to fit snugly in a counterbored seat 18, formed in the adjacent end of the coupling 8. This coupling 7 also has on diametrically opposite sides outstanding projections 19, which projections also extend forwardly of an annular shoulder 20, formed at the juncture of the collar 17 and the main body of the member, this shoulder being shown in Figs. 3 and 4.

The coupling member 8 has at its inner end and in diametrically opposite sides recesses or seats 21, that are adapted to receive the projections or lugs 19, which lugs completely fill the seats, and thus prevent the relative rotation of the members when together. The annular margin of the member 8 between the seats is provided with outstanding stop-flanges 22, and the space between said flanges and the inner end of the retaining-sleeve 13 constitutes an annular guideway for a coupling-ring 23, having an inturned flange 24, that engages in said guideway. The coupling-ring is of greater diameter than either of the members 7 and 8 and has outstanding projections 25, by means of which it can be readily grasped and turned. Extending into the same from the side that is opposed to the handle portion 16 of the member 7 are diametrically opposite bayonet-slots 26, which slots are designed to receive the outstanding portions of the projections 19 of the member 7.

It is believed that the operation of this device will be easily understood. In securing the sections of the pipe to the members the terminals of such sections are forced upon the tapered ends of the shells and the sleeves afterward screwed home, thus fastening the sections in place. In coupling the sections it is only necessary to aline the bayonet-slots of the ring with the seats 21 of the coupling member 8, whereupon the forwardly-projecting collar portion of the member 7 is passed into the open mouth of the member 8, and the projections 19 will thereupon engage in the seats 21 and in the mouths of the bayonet-slots. Upon turning the coupling-ring 23 said mouths will be moved out of alinement with the projections, and the coupling will therefore be completed. In this structure it will be apparent that the projections 19 perform double functions, in that they serve to prevent the relative rotation of the elements and also interlock with the ring to secure the members against disassociation. The structure is very simple, as will be apparent, and the parts thereof can be easily and cheaply manufactured.

From the foregoing it is thought that the construction, operation, and many advantages of the herein-described invention will be apparent without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

In a pipe-coupling, the combination with the elements to be coupled, one of said elements being arranged to fit within the other and having diametrically opposite outstanding and forwardly-extending projections, the edge of the other element having diametrically opposite seats to receive the forwardly-extending portions of the projections, of a coupling-ring revolubly mounted upon the member having the seats and overhanging said seats, said ring being provided with bayonet-slots that extend but partially through the ring and receive the outstanding portions of the projections, the inner end walls of said slots being substantially coincident with the end walls of the seats.

In testimony that I claim the foregoing as my own I have hereto affixed my signature in the presence of two witnesses.

WINFIELD S. HOUSER.

Witnesses:
H. A. MOORE,
J. H. MOORE.